Feb. 2, 1932.  C. G. SMITH  1,843,521

RECTIFYING SYSTEM

Original Filed March 15, 1928

Inventor
Charles G. Smith
by L. Roy Williams
Atty.

UNITED STATES PATENT OFFICE

CHARLES G. SMITH, OF MEDFORD, MASSACHUSETTS, ASSIGNOR TO RAYTHEON INC., OF CAMBRIDGE, MASSACHUSETTS, A CORPORATION OF MASSACHUSETTS

RECTIFYING SYSTEM

Application filed March 15, 1928, Serial No. 261,975. Renewed January 17, 1931.

The present invention relates generally to rectifying systems and in particular to an arrangement for delivering smooth rectified current from a single phase source.

In the translation of single phase into direct current, it has been customary to pass the alternating current directly through the rectifier, half or full wave, and to depend upon filters in the output circuit for rendering a substantially constant potential. Due to the pulsatory character of the output potential particularly accentuated in the case of half wave rectifiers, the smoothing properties of the filter are severely taxed, calling for reactance units of large dimension or an excessive number of filter sections. Moreover, by reason of the intermittent character of the pulsations, there exists within the network considerable loss by reflection which necessarily adds to the burden of the rectifiers. When the direct current load is the plate or filament circuit of a thermionic amplifier, requiring the highest degree of potential constancy under all conditions of load, the smoothing demand made on prior art single phase rectifying apparatus is considerably greater than can be satisfactorily sustained.

Among the objects of my invention is to adapt single phase alternating currents to a direct current load which changes in magnitude and which necessitates considerable uniformity of potential. Another object is to provide a rectifying system for the purposes set forth, of character such that the rectifying unit is subject to the minimum amount of reverse or reflected current and to a relatively constant output. A further object is to provide a translation arrangement of rugged and simple design, requiring no moving parts.

Referring to the drawings which show a preferred embodiment,

Figure 1:
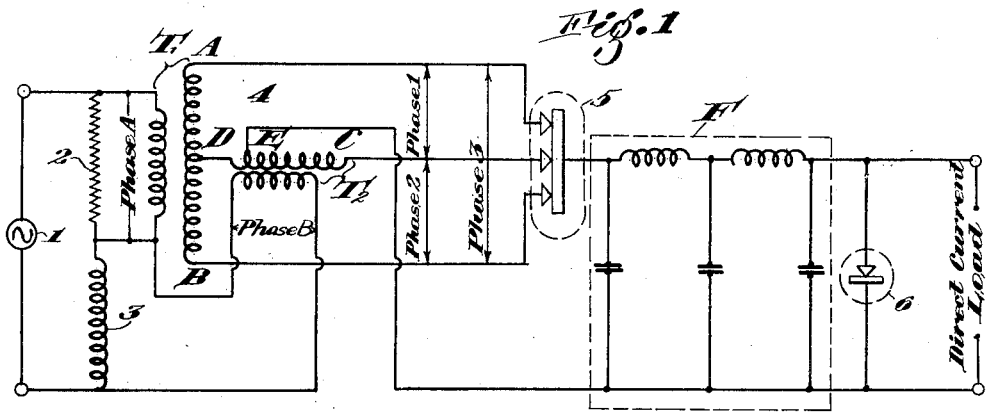
Figure 1 represents a schematic view of the entire translating system.

In Figure 1, numeral 1 indicates the source of single phase alternating current, ordinarily house supply, to be converted into direct current. Across the terminals of the source, there is connected in series, a network consisting of resistance 2 and inductance 3 which cooperate to divide the single phase energy into two components designated phases A and B of substantially equal magnitude and in substantial quadrature. To assure a phase displacement of 90°, the resistance should be wound with as little inductive reactance as possible and inductance 3 preferably should contain minimum resistance. The two voltage components are applied across the terminals of a Scott or T-connection 4 to obtain three phase energy, the latter being translated into direct current by the multi-anode rectifier 5 as will be explained hereinafter. In the translation from two to three phase, two transformers $T_1$—$T_2$ are employed, having primaries of equal characteristics, energized by potentials derived from the resistor 2 and inductance 3 respectively. The secondary A B of transformer $T_1$ has tap D at the center, to which is connected a secondary terminal of transformer $T_2$. In order to provide the proper phase relation between and magnitude of, the three energy components, the turn ratios of transformers $T_1$ and $T_2$ should be such that the voltage across coil CD is equal to 0.867 of that between points A and B.

Figure 2:
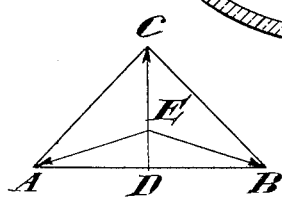
Figure 2 is a vector diagram of voltages applied across the rectifier in Figure 1.

From an inspection of the vector diagram in Figure 2, it may be seen that the voltages taken between terminals A—C, C—B and B—A are displaced 120° to form three phase delta, all of substantially equal magnitude. The letters on the diagram identify the vectors with respect to the windings. The neutral point E is situated on the secondary C—D so that vectors E A, E B and E C are equal; this condition is satisfied when the voltage across the coil D E is 0.289 that of the three phase line. In the event that power supplied to the Scott transformer is unbalanced, e. g. when either of phases A and B preponderate, balanced three phase output may still be obtained for conversion to rectified direct current by properly displacing the connection D from the midpoint of the secondary and a proper choice of the ratio of turns on coil EC, departing from the ratio .867 above mentioned.

From the terminals A, B and C, the three phase energy is passed through rectifier 5 of suitable type and translated into direct current for consumption purposes; one side of the direct current line is connected to the common electrode of the rectifier, the other side to the neutral point E. If desired, the rectified output may be smoothed by filter F of standard e. g. a series inductance-shunt capacity network. While any suitable form of multiphase rectifier may be employed to advantage or even a number of single phase units, I prefer a glow discharge device similar to the Raytheon type B H so-called, as described and claimed in the applications of Smith, Serial No. 526,095 and V. Bush, Serial No. 22,988 except that an additional electrode is utilized. There is a decided improvement in the characteristics of a glow discharge rectifier when three anodes and a cathode are operated in a three phase circuit.

In order to maintain the vector relation shown in Figure 2, it is apparent that the sum of the instantaneous effective values of current in the three phases remain substantially constant at predetermined magnitude throughout the operating period. In case the load constitutes the plate or filament circuit of a radio amplifier subject to frequent change of current demand e. g. when the electrostatic charge on the grid fluctuates or when amplifiers are cut in or out, it is necessary to maintain a constant energy level through the transformers. This may be accomplished by by-passing a predetermined portion of the total current through device 6 preferably of glow discharge type in which the potential across the terminals remains the same irrespective of the magnitude of current passing therethrough, so that the load in aggregate drawn from the rectifier remains practically uniform.

Figure 3:
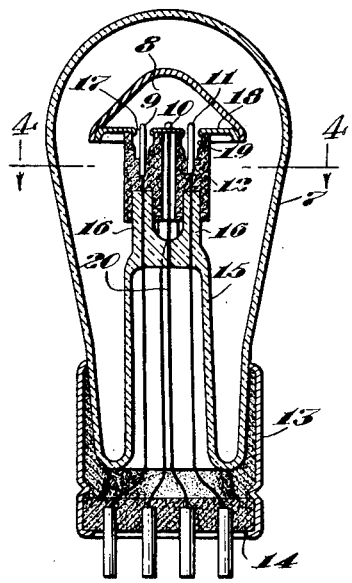
Figure 3 illustrates a typical rectifier and current by-pass.
Figure 4:
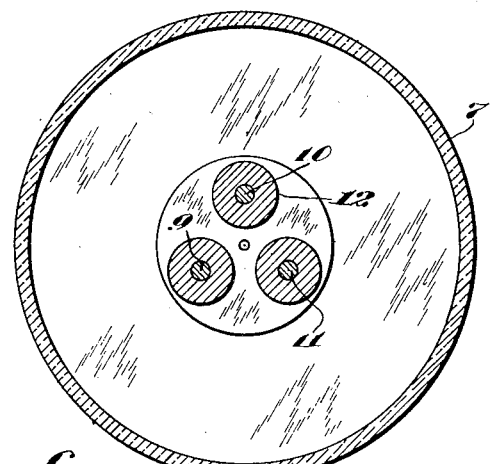
Figure 4 is an enlarged sectional view taken along line 4—4 in Figure 3.

Referring to Figures 3 and 4, I show a preferred type of rectifier which also has adaptation as the current by-pass. In Figure 3, numeral 7 designates an envelope of glass containing hollow cathode 8 of refractory material as nickel, tantalum or the like, anodes 9, 10, 11 also of refractory material, insulating thimbles 12 preferably of lavite and a base comprising metallic cylinder 13 sealed by suitable compound to the tube in the usual manner. The bottom of the cylinder is closed by porcelain disk 14 into which the connector plugs project. The envelope 7 has re-entrant stem 15 provided with two tubular projections 16 which extend into recesses in the bottom of thimble 12, the latter being slipped over the projection 16 and held in position by cathode 8. The anodes are mounted in openings in the member 12 concentrically with projections 16 and openings 17 in the cathode. The cathode is preferably formed in two parts, the upper part comprising a conically-shaped element and the lower part 18 comprising a cover fitting the open end of the cone. As stated in the applications supra, thimbles 12 are spaced from the anodes a distance comparable to the ionizing path of electrons present and serve to prevent the passage of current between either anode and the outer surface of the cathode. The ionic activity is thus confined to the space enclosed by the cone, i. e. the region adjacent the inner surface of the latter. In order to minimize the internal losses of the device, I may coat the active portion of the cathode with a substance, as alkaline earth or alkali metal to increase thermionic emission. The cylindrical members 12 contain circular recesses 19 adjacent to the opening 17 to prevent or reduce to a negligible factor the tendency of current to flow between cathode and either anode along the surface of insulation. The openings 17 are of such size as to provide space between the cathode and each anode, comparable to the mean free path of electrons within the region of the cathode. While the latter may be supported solely by cylindrical member 12, I prefer to partly depend for support on the centrally located cathode lead 20 which is joined electrically to one of the connector plugs. After evacuating the tube and removing the occluded material, monatomic gas of the helium group or a mixture of the same is admitted at a pressure approximating 10 mm. Hg.

As shown in Figure 1, each of the anodes 9, 10 and 11 are connected to the extreme terminals of the Scott or T-connection secondaries, the cathode 8 forming one side of the load circuit. If desired, a three cathode-single anode device may replace the specific tube illustrated, although the three anode construction is preferred, due to the overlapping effect of the several voltage components the glow within cathode 8 is never extinguished and hence the average internal impedance of the discharge under operating conditions is relatively low with consequent small energy loss. It appears that the discharge while being kept alive as back current to one or more of the anodes lowers the voltage drop of the main discharge. Moreover, the continuity of the discharge subjects the electrodes, particularly the cathode, to an even ionic bombardment, peak current being reduced thus, prolonging the operating life of the device. It is also evident that the direct current potential available at the rectifier terminals is substantially invariable due to the beneficial reaction of the three phases on one another, i. e. filling in the troughs of each wave. From the symmetrical distribution of the anodes with respect to each other and to the cathode, it is obvious that the drop from the cathode to each anode is substantially equal.

When the described tube is to be used as current by-pass 6, connection is made to only one anode and the cathode although obviously, a special tube having the electrodes which are essential, may be provided. Due to the particular arrangement and shape of electrodes, also pressure and nature of gas, the device has a voltage-current characteristic with substantial portion in parallel to the current axis; the portion of characteristic selected for the by-passing function is such that substantial changes in current through the tube result either in no voltage variations across the terminals or such variations as are substantially immaterial in magnitude. It is apparent that in addition to maintaining a relatively constant load in aggregate, the shunted discharge device materially aids the filter in providing an output voltage devoid of ripple. While I have described a particular form of current by-pass, it is evident that other apparatus having the desired characteristics particularly in regard to the relation between the terminal voltage and the current passing serially through the apparatus, are equally adapted to my system.

I claim:

1. In combination, a source of single phase current, a direct current load, means interposed therebetween for changing the single into two phase and the two phase into three phase current, a rectifier for translating the polyphase energy into direct current and means for by-passing across the load, a portion of the direct current output.

2. In combination, a source of single phase current and a direct current load having interposed therebetween the following apparatus in series, a combined resistive-inductance network adapted to change the single phase energy into two phase, a T-connection transformer adapted to translate the two phase into three phase, a glow discharge rectifier and means for by-passing a portion of the rectifier output across the load.

3. In combination, a source of single phase current and a direct current load having interposed therebetween the following apparatus in series, a combined resistive-inductance network adapted to change the single phase energy into two phase, a T-connection transformer adapted to translate the two phase into three phase, a glow discharge rectifier and means for by-passing a portion of the rectifier output across the load, said means comprising a device, the terminal voltage of which remains substantially constant irrespective of the magnitude of current passing therethrough.

4. In combination, a source of single-phase current, a direct current load, means interposed therebetween for changing the single into two-phase and the two-phase into three-phase current, a rectifier for translating the polyphase energy into direct current, and a glow discharge tube for bypassing across the load a portion of the direct current output.

In testimony whereof, I have signed my name to this specification.

CHARLES G. SMITH.